United States Patent [19]

Cantrell

[11] 4,385,419
[45] May 31, 1983

[54] CHICKEN DEBONING APPARATUS AND METHOD

[75] Inventor: George T. Cantrell, Oakwood, Ga.

[73] Assignee: Cantrell Machine Co., Inc., Gainesville, Ga.

[21] Appl. No.: 358,001

[22] Filed: Mar. 15, 1982

[51] Int. Cl.³ ............................................. A22C 21/00
[52] U.S. Cl. ........................................ 17/11; 17/1 G; 17/46
[58] Field of Search ..................... 17/11, 1 G, 24, 1 R, 17/46, 44, 44.1

[56] References Cited

U.S. PATENT DOCUMENTS

| | | |
|---|---|---|
| 1,097,017 | 5/1914 | Hadfield . |
| 1,272,346 | 7/1918 | Jefferies et al. . |
| 1,416,443 | 5/1922 | Brown ..................................... 17/24 |
| 1,749,224 | 3/1930 | Ostricher . |
| 3,166,785 | 1/1965 | Lemmond . |
| 3,570,050 | 3/1968 | Draper et al. . |
| 3,946,461 | 3/1976 | Martin ..................................... 17/11 |
| 4,067,085 | 1/1978 | Gasbarro ................................ 17/11 |
| 4,128,916 | 12/1978 | Fick, Jr. et al. ..................... 17/24 X |
| 4,181,228 | 1/1980 | Hashimoto et al. . |

FOREIGN PATENT DOCUMENTS 1008772 11/1965 United Kingdom .

Primary Examiner—Willie G. Abercrombie
Attorney, Agent, or Firm—Julian W. Dority

[57] ABSTRACT

A method and apparatus for deboning chicken is disclosed which includes providing a novel chicken deboning horn B,B' which is rigidly mounted to a stabilized table top conveyor A so that a chicken carcass P may be rigidly supported and conveyed for carving of the meat away from the bones in a mass production system. The deboning horn preferably includes a smooth horn 40 having a contoured surface 42 inclined upwardly to a reduced upper portion 40b which enters an internal cavity 43 of the carcass P. Thus, inserted, the horn contour bears against and engages spaced portions in the cavity to hold it rigid and upright while enabling rotation of the carcass for selective carving. The horn contour accepts a wide range of carcass cavity sizes owing to its cone-shaped contour. Alternate chicken retaining supports 50, 62 support poultry portions 58, 72 separately for deboning. At least the upper run of conveyor A is stabilized by means of longitudinal guide rails 12 having guide slots 12a in which opposing ends 20a, 20b of the conveyor links 20 are effectively retained.

16 Claims, 10 Drawing Figures

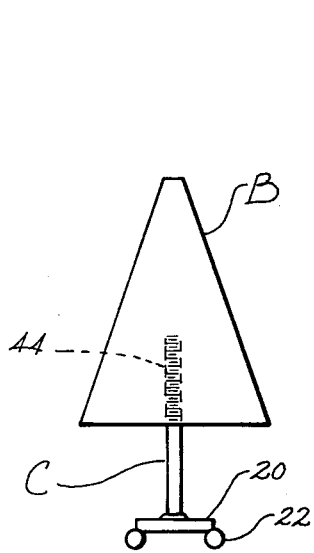
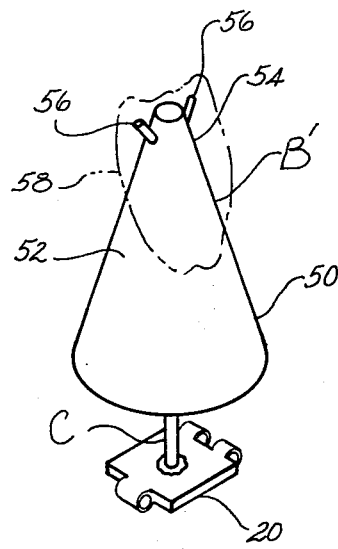
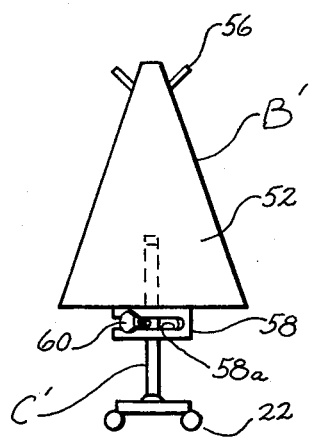
Fig. 5　　　Fig. 6　　　Fig. 7
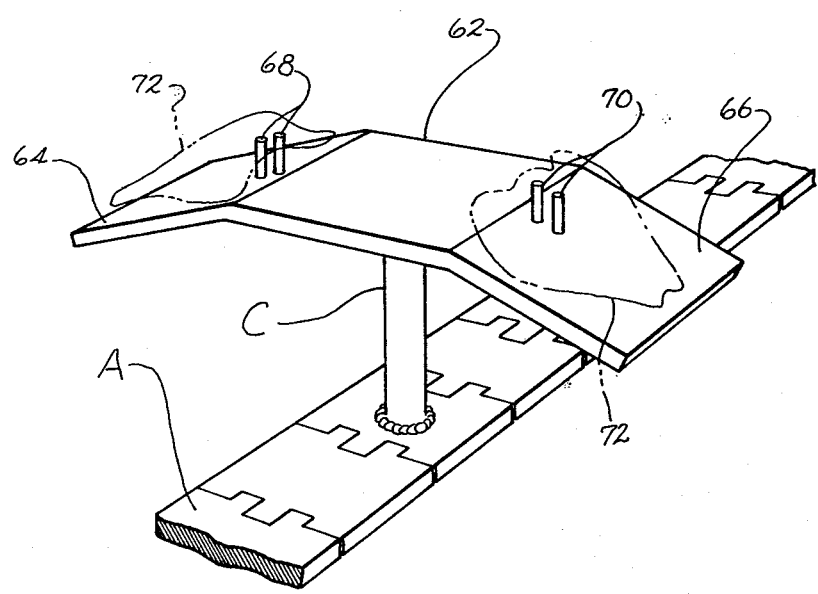
Fig. 8

CHICKEN DEBONING APPARATUS AND METHOD

BACKGROUND OF THE INVENTION

The present invention relates to the process of removing meat from the bones of poultry, particularly chicken, by manually carving the meat away from the bones. In particular, the invention relates to apparatus for supporting the poultry carcass in an upright position in a manner in which the poultry may be rigidly supported and may be selectively positioned for carving.

Heretofore, arrangements have been proposed for conveying and processing chicken such as by overhead shackle-type conveyors as shown generally in U.S. Pat. No. 3,166,785. However, the problem arises that the chicken is not suitably mounted for carving of the meat away from the bones since the chicken is in a relatively unstable position swinging overhead from the shackles.

Other prior systems proposed for the deboning of chicken include that shown in U.S. Pat. No. 3,570,050 wherein a poultry carcass is conveyed horizontally and a plurality of water jets are utilized to separate the meat from the carcass. Of course, this requires a rather complicated system and the conveyor does not present the poultry in a satisfactory configuration for manual deboning nor is the poultry carcass suitably stabilized and supported for carving.

While other arrangements have been proposed for processing and conveying of other articles, such as shown in U.S. Pat. Nos. 4,181,228, 1,749,224, and British Pat. No. 1,008,772, these arrangements are not suitably stable as conveyors and supports for supporting a weighty poultry carcass during carving. For the efficient mass production of boned chicken, the poultry carcass must be rigidly supported for carving and be selectively positionable on the support to facilitate the carving, all of which must be done on a stable but traveling platform.

Accordingly, an important object of the present invention is to provide chicken conveyor and deboning apparatus on which chicken may be deboned in a highly efficient and productive manner in mass.

Another important object of the present invention is to provide an apparatus and method for the deboning of chicken in which the chicken is rigidly but selectively supported and positioned while being stably conveyed during carving.

Still another important object of the present invention is to provide apparatus for deboning chicken which accommodates a wide variety of poultry carcass sizes and rigidly supports the carcass in a stable upright, vertical position during carving.

Still another important object of the present invention is to provide a chicken deboning conveyor which utilizes a stabilized traveling conveyor platform on which spaced poultry deboning horns are rigidly attached whereby the poultry is rigidly supported and conveyed for carving.

Still another important object of the present invention is to provide a poultry deboning apparatus which includes a novel poultry deboning horn contoured to reliably and rigidly support a poultry carcass while permitting selective rotation of the carcass thereon for carving.

SUMMARY OF THE INVENTION

The above objectives are accomplished according to the present invention by providing an endless traveling conveyor platform which is held rigidly stabilized except for movement in the direction of conveyance. A plurality of chicken retaining supports are spaced and rigidly mounted along the length of the conveyor platform. The chicken retaining supports are contoured to bear against portions of an interior body cavity of a carcass of the poultry to rigidly support the carcass in an upright vertical position. While supported and conveyed in the rigid vertical position, the poultry carcass may be conveniently deboned by the attendant. Advantageously, the chicken retaining support is contoured to bear against portions of the interior body cavity to rigidly support the carcass while at the same time permit rotation of the carcass for selective positioning during carving by the attendant.

In a preferred form, the chicken retaining support is illustrated in the form of an inverted deboning horn contoured to taper upwardly toward a top portion for receiving and supporting the chicken carcass having a smooth contour which enables rotation of the carcass.

The apparatus includes a frame having an endless conveyor carried thereon which includes widened link plates having their ends slidably received in a longitudinal guide slot along a top run of the conveyor maintaining the conveyor laterally and vertically stabilized. The poultry deboning horns are carried by means of rigid mounts welded to the conveyor platform so that the poultry is supported and conveyed in a suitably rigid manner for manual deboning. In other embodiments, the chicken retaining support includes inclined surfaces having prongs carried thereon on which various portions of the poultry may be attached and supported for deboning.

DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 5 is an elevation of a poultry deboning horn constructed according to the present invention;

FIG. 6 is a perspective view of an alternate embodiment of a poultry deboning horn constructed according to the present invention;

FIG. 7 is an elevation of an alternate embodiment of a deboning horn constructed according to the present invention;

FIG. 8 is a perspective view of an alternate embodiment of a poultry retaining support rigidly attached to a conveyor platform as constructed according to the present invention;

DESCRIPTION OF A PREFERRED EMBODIMENT

The invention relates to a method and apparatus for deboning poultry. The method includes providing an elongated traveling conveyor platform being generally rigid and immovable except in the direction of conveyance, and a plurality of chicken retaining means spaced along the length of conveyor platform which are rigidly mounted thereto. Next, a chicken carcass is supported on each of the retaining means so that a contoured portion of retaining means bears against portions of an interior body cavity of a carcass of poultry to rigidly support the carcass in a generally upright vertical position. Finally, the poultry carcass is conveyed on the retaining means in and upright position while the poultry meat is removed from the carcass.

Apparatus for carrying out the method includes a frame having a conveyor carried on the frame which includes at least one endless traveling platform A. Means B for retaining the poultry carcass includes a plurality of poultry deboning horns carried on the traveling platform in spaced relation along the length of the platform. The deboning horn is contoured to enter and engage within an interior body cavity of the poultry carcass. Each deboning horn includes a contoured support surface bearing against portions of the body cavity to rigidly support the carcass in a generally upright vertical position during deboning. Preferably, the contoured support surface is smoothly contoured to enable rotation of the poultry carcass about the deboning horn facilitating selective positioning of the carcass for carving by the operator. A rigid support mounting C which is welded to the platform A rigidly affixes the deboning horn B to the conveyor platform. The conveyor platform includes a plurality of tranversely extending links pivotably hinged to one another. Longitudinal guide means D extends along at least an upper run of the conveyor which includes a guide slot in which opposing ends of the link elements are received on both sides of the platform restraining them against movement to provide a stabilized platform for rigid mounting of the poultry carcass during carving.

Figure 1:
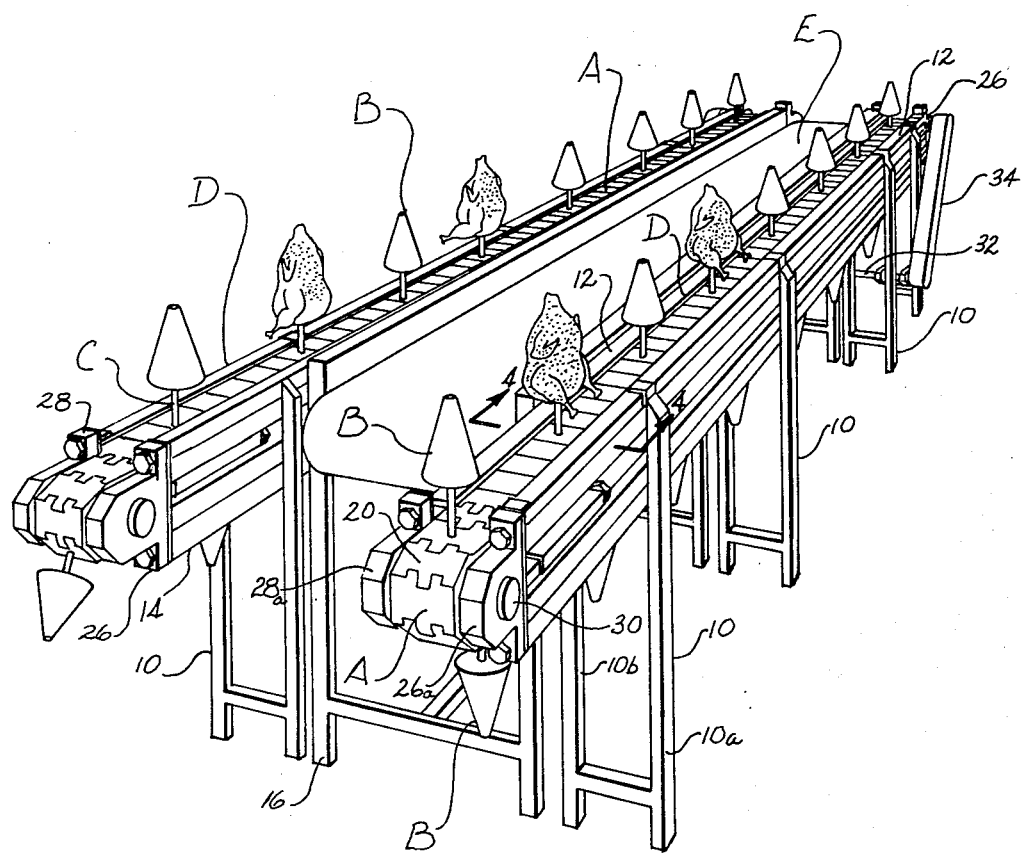
FIG. 1 is a perspective view illustrating deboning apparatus constructed according to the present invention.
Figure 2:
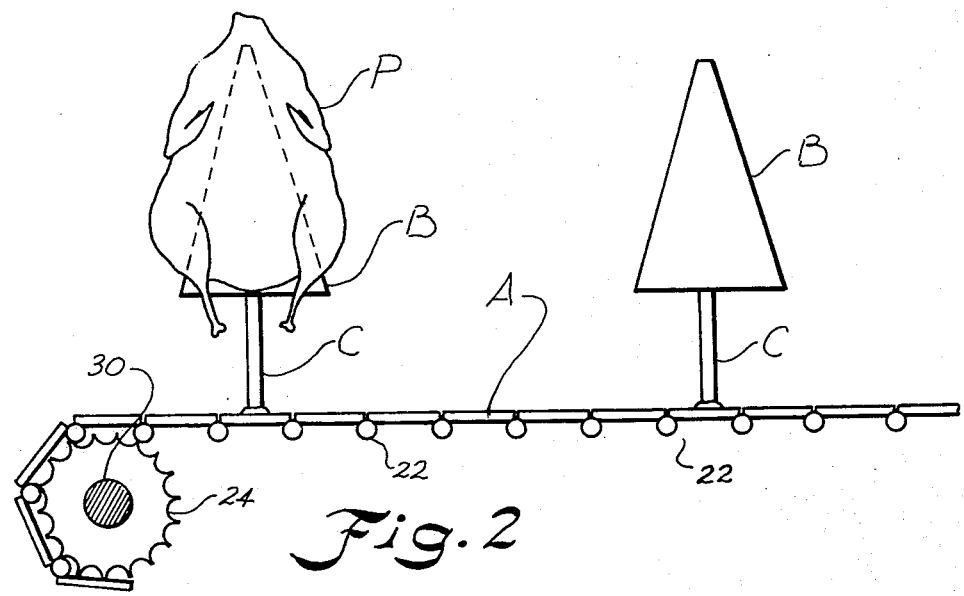
FIG. 2 is a partial enlarged end view of chicken deboning apparatus constructed according to the present invention.
Figure 3:
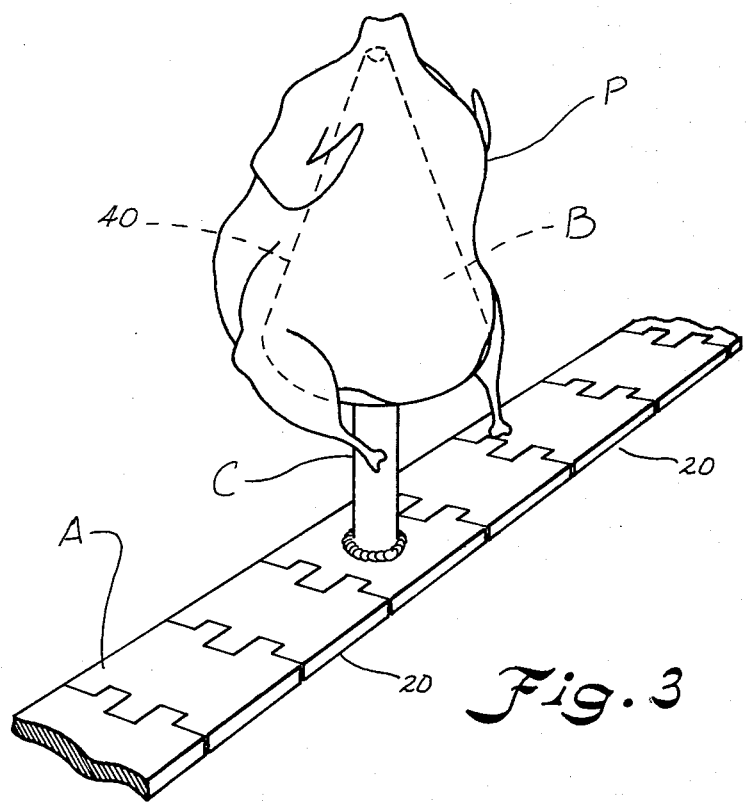
FIG. 3 is a perspective view illustrating a poultry carcass supported on a poultry deboning horn and table top conveyor according to the present invention.

As illustrated, the frame includes a table frame having frame leg pairs 10 to which are rigidly attached longitudinal frame rails 12 and 14 on opposing sides of the conveyor A which is a table top conveyor. FIG. 1 illustrates a pair of conveyors A on either side of a second conveyor E which travels between the two outer deboning conveyors A for conveying the meat after separation from the poultry carcass. The table legs 10a and 10b of each pair 10 may be suitably affixed to the opposing upper and lower rails 12 and 14 on either side of the conveyor A. The middle conveyor E is likewise supported on table leg pairs 16 spaced along the length of the conveyor.

Table top conveyor A is comprised of a plurality of transversely spanning links 20 which consist of stainless steel plates hinged together by means of pins 22 to form an endless traveling platform. The conveyor platform travels about sprockets 24 at each end of the conveyor which engage the pins 22 to drive the conveyor platform in the direction as shown by arrows. The sprocket assemblies are carried at the ends of the conveyors by means of mounting brackets 26 and 28 mounted to both opposing ends of the rails 12 and 14 which include bearing blocks 26a and 28a through a shaft 30 extends having the sprocket 24 affixed thereto. At one end of the conveyor a suitable drive arrangement is provided such as an electric motor (not shown) having an output shaft 32 with a sprocket (not shown) affixed thereto which drives a sprocket (not shown), carried on shaft 30a by means of a chain (not shown) underneath chain cover 34. Drive sprocket 24a is, in turn, connected to a shaft 30a.

Opposing upper conveyor rails 12 include longitudinal guide means in the form of a longitudinal slot 12a which receives opposing ends 20a and 20b of the link plates 20 to retain and guide them. Slot 12a is illustrated in the form of a generally C-shaped slot with openings of opposing rails facing one another and may be provided in lower rails 14 as well. The transverse plates are effectively stabilized in the transverse (lateral) and vertical directions relative to the longitudinal axis and direction of conveyance.

Poultry retaining means B is preferably in the form of a horn support 40 having a contoured surface 42 for engaging portions of the internal thoracic cavity 43 of the poultry carcass P when inserted therein. The contoured support bears against the interior body cavity to rigidly support the poultry carcass in a generally upright vertical position as illustrated.

The deboning horn 40 has been found to be a highly advantageous form of a poultry retaining means since its contour conforms with those portions of the internal body cavity of the poultry carcass necessary to rigidly support the carcass and accommodate a wide variety of carcass and cavity sizes supporting the same rigidly. Deboning horn 40 is attached to the rigid mounts C by any suitable means such as a threaded coupling 44.

The contour of the deboning horn tapers from a widened lower portion 40a to a reduced upper portion 40b which may project from the cavity opening adjacent the neck portion 44 of the poultry carcass and engage the clavical bones 45 of the poultry carcass in this area in a rigid fashion. The contour of deboning horn B between the lower and upper portions thereof normally engages, to an extent, the back bone 46, side ribs 47 and/or breastbone structures 48 rigidly interlocking and supporting the carcass on the deboning horn.

Figure 4:
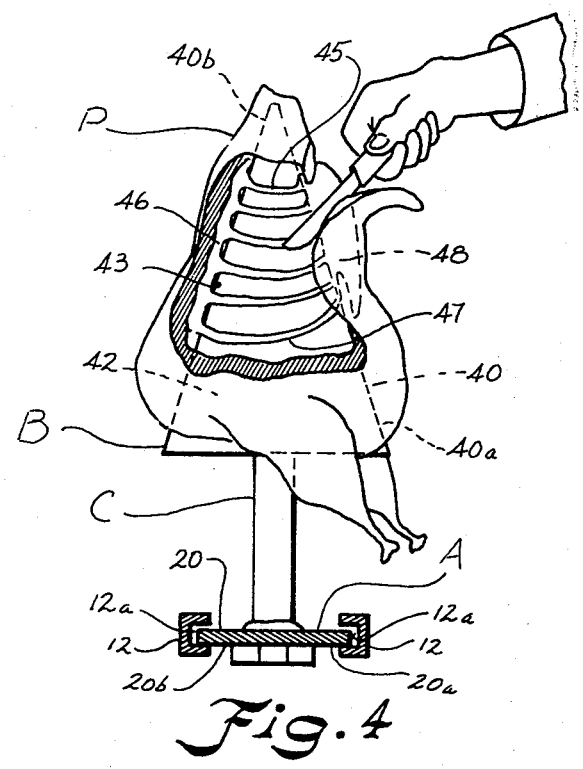
FIG. 4 is a partially cut away view illustrating the support and retention of a poultry carcass on a deboning horn in accordance with the invention.

As can best be seen in FIG. 4, the generally rigid table top conveyor platform A, the rigid support C, and the rigid support of the poultry carcass P on the deboning horn 40 together provide for rigid support and conveyance of the poultry carcass P expediting manual deboning to facilitate efficient mass production.

FIG. 6 illustrates an alternate embodiment of a poultry retaining means B' in accordance with the invention wherein a deboning horn 50 is provided having a contoured surface 52 identical to the contour 42 of deboning horn 40. Adjacent an upper tapered end 54 of the deboning horn 50 is carried prong means in the form of diverging prongs 56. The prongs 56 are utilized for supporting a breast 58 or other portion of the poultry being deboned. With the poultry portion retained and hooked on the prongs, the remainder is supported on the contoured surface 52 of the deboning horn 50 such that the meat may be carved away from the bone.

FIG. 7 illustrates yet another embodiment of the invention wherein the deboning horn 50, which may also be a deboning horn such as at 42, is rotatably supported on the rigid support mounting C' by means of a rotatable coupling assembly 58 carried by the deboning horn 50 which may be rotated in its position relative to the shaft C' and locked in this rotated position by means of a set screw 60 received through a groove 58a of the coupling. With the screw threaded into a shaft C' and tightened against the coupling 58, horn 50 is locked on the support shaft. Thus, the deboning horn 50 may be rotated to present the portion of poultry attached to prongs 56 in proper position for carving.

FIG. 8 represents another embodiment of the invention wherein the chicken retaining means is illustrated in the form of a support 62 fixed to shaft C and a pair of inclined support surfaces 64 and 66 on which are carried prong means in the form of straight or diverging prong 68 and 70, respectively. Thus, the support 62 may be utilized to support two portions of poultry meat, such as breasts 72 for deboning with the poultry being retained by the prongs and supported on the inclined surfaces 64 and 66 for carving.

Figure 9:
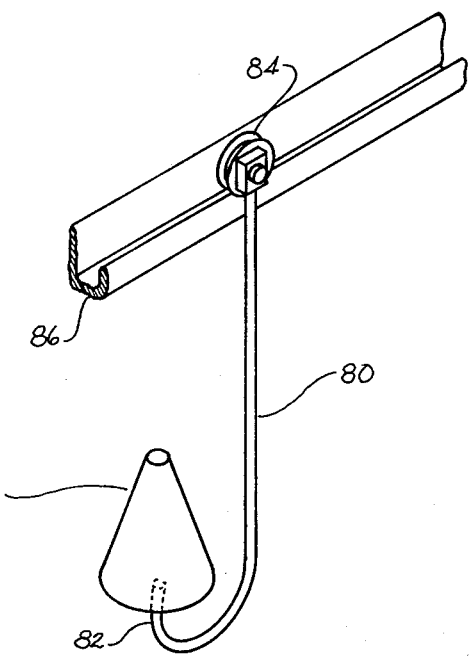
FIG. 9 is a perspective view illustrating an alternate embodiment of a conveyor and chicken deboning horn constructed according to the present invention.

While the deboning horn, according to the invention, has been illustrated on a rigid conveyor, in other applications of chicken processing, it may be desirable to support the deboning horn on an overhead conveyor, as can best be seen in FIG. 9. As illustrated, the support F for deboning horn B includes an elongated shank 80 terminating in a reversed upwardly extending portion 82 which is affixed to the deboning horn supporting the mounting the deboning horn. The opposing end of the shank 80 may be provided by a pulley 84 which rides in a rail 86 on overhead conveyor.

Figure 10:
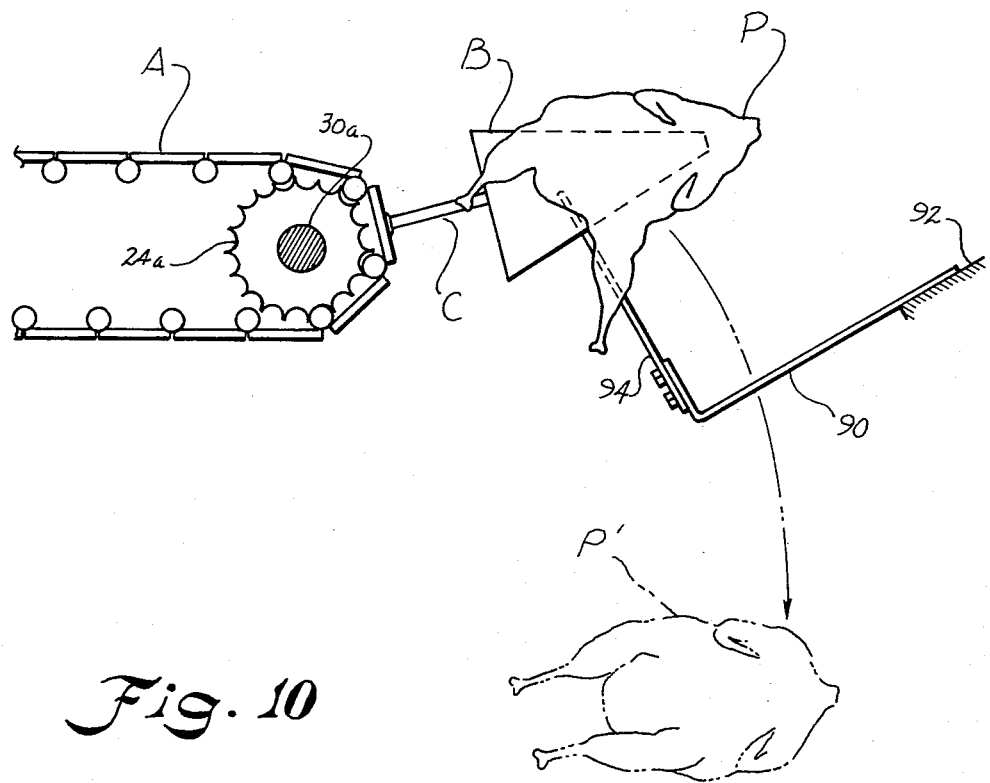
FIG. 10 is a partial elevation illustrating the removal of a poultry carcass from a poultry deboning apparatus according to the present invention.

Referring to FIG. 10, means is illustrated for removing the poultry carcass from the deboning horn B after the carcass has been deboned. The poultry removal means includes a bracket 90 rigidly mounted to a support surface at 82 adjacent the end of the conveyor A. Attached to the bracket is a finger plate 94 which engages a portion of the poultry carcass adjacent the deboning horn B such that the poultry is caused to slide over the upper end 40b of the deboning horn as the deboning horn turns past the vertical on the conveyor. The removed carcass P' may then be sent to a waste container or other processing station.

Thus, it can be seen that an advantageous apparatus and method can be had according to the present invention for deboning poultry wherein the poultry is rigidly supported in a highly satisfactory manner for manual carving of the meat away from the bones. The alternate forms of the poultry retaining support may be utilized alone or in combination with main deboning horn 40 on the conveyor as desired for the deboning process.

While a preferred embodiment of the invention has been described using specific terms, such description is for illustrative purposes only, and it is to be understood that changes and variations may be made without departing from the spirit or scope of the following claims.

What is claimed is:

1. Apparatus for deboning chicken comprising:
   an elongated frame;
   an elongated conveyor carried by said frame;
   means stabilizing said conveyor against movement in vertical and transverse directions with respect to the direction of conveyance providing a generally rigid moving platform;
   a plurality of chicken retaining means carried by said conveyor in spaced relation along the length of said conveyor for supporting chicken carcasses;
   said chicken retaining means including cone-shaped means with a substantially smooth surface thereon receivable in an internal cavity of said chicken carcass engaging portions of said chicken carcass within said internal cavity rigidly supporting said chicken carcass in a generally upright vertical position for permitting deboning;
   means rigidly mounting said retaining means on said conveyor so that said conveyor and said retaining means, are unitarily rigid and said chicken carcasses are firmly held in said upright position as they are moved along the run of said conveyor;
   whereby persons standing along said conveyor can readily debone said chickens as said chickens are moved along the length of said elongated frame.

2. The apparatus of claim 1 wherein said contoured means is contoured to engage upper and lower portions of said internal cavity of said carcass at spaced portions thereof to support same rigidly thereon.

3. The apparatus of claim 1 wherein said contoured means is contoured to accommodate a wide variety of poultry carcass cavity sizes engaging portions of different size cavities to support same in said rigid position.

4. The apparatus of claim 1 wherein said conveyor has transversely spanning link means stabilized in said movement by longitudinally extending guide means limiting movement of opposing ends of said link means in vertical and transverse directions relative to the direction of conveyance.

5. The apparatus of claim 4 wherein said guide means includes longitudinal slots extending substantially over a top run of said conveyor, said opposing ends of said link means being retained and guided by said slots securing same against said movement.

6. The apparatus of claim 1 including poultry removal means carried adjacent an end of said conveyor in the direction of conveyance for engaging said chicken carcass after said retaining means turns past a vertical at said end facilitating removal of the same from said retaining means.

7. The apparatus of claim 1 including a second conveyor carried by said frame adjacent said first mentioned conveyor conveying said poultry meat after separation from the carcass.

8. Poultry deboning apparatus comprising:
   an elongated conveyor;
   poultry retaining means carried in spaced relation on said elongated conveyor;
   mounting means rigidly attaching said retaining means to said conveyor;
   said poultry retaining means including a deboning horn having a contoured support surface means inclined toward an upper portion thereof;
   said horn having prong means adjacent said upper portion diverging outwardly for contacting a portion of said poultry carcass while a remainder of said carcass portion is supported on said contoured surface; and
   whereby the poultry may be firmly supported and retained for carving to facilitate separation of the poultry meat from the carcass by people positioned along the run of said conveyor as said poultry is moved by said elongated conveyor.

9. The apparatus of claim 8 wherein said deboning horn is rotatably carried by said support means which is affixed to said conveyor belt and includes coupling means for fixing said deboning horn in a desired rotated position on said mounting means.

10. The apparatus of claim 8 wherein said poultry retaining means includes opposing contoured surfaces inclined upwardly toward said upper portion, said prong means carried on said inclined surfaces retaining said poultry supported on said contoured surfaces during deboning.

11. The apparatus of claim 8 wherein said conveyor is an overhead conveyor and includes means suspending said deboning horn from said conveyor means in said inverted configuration.

12. The apparatus of claim 11 wherein said suspension means includes a hook member having an elongated shank and an up-turned reversed free end carried by said shank on which said deboning horn is carried.

13. The apparatus of claim 8 wherein said conveyor includes transversely spanning link means and longitudinal guide means receiving ends of said link means stabilizing said link means to provide a generally rigid platform for rigidly supporting said carcass during deboning.

14. The apparatus of claim 8 including poultry removal means carried adjacent an end of said conveyor in the direction of conveyance for engaging said poultry after said poultry retaining means turns past a vertical at said end facilitating removal of said poultry from said horn.

15. The apparatus of claim 8 wherein said deboning horn is receivable within an internal cavity of a poultry carcass and has a contoured cone-shaped surface being continuously smooth around its periphery enabling rotation of said poultry carcass about said deboning horn for selective positioning of said carcass during deboning while accommodating vertical placement and support for a wide variety of poultry carcass size.

16. Poultry deboning apparatus comprising:

a frame;

a conveyor carried on the frame including at least one endless traveling platform;

a plurality of poultry deboning horns carried on said traveling platform in spaced relation along the length thereof;

said deboning horn receivable in an interior body cavity of a poultry carcass for retaining said carcass during deboning;

each said deboning horn including a contoured support surface bearing against portions of said body cavity to rigidly support said carcass facilitating carving of poultry meat therefrom;

said contoured support surface being smoothly contoured enabling rotation of said carcass about horn for selective positioning for carving;

a generally rigid support mounting affixing each said deboning horn to said conveyor platform; and a generally rigid support mounting affixing each said deboning horn to said conveyor platform; and said traveling conveyor platform including transversely extending link means pivotably hinged to one another and means stabilizing said platform in directions vertical and transverse to the direction of conveyance whereby people positioned along the run of said conveyor can debone said chickens as said chickens are moved thereby on said conveyor.

* * * * *